United States Patent
Shin et al.

(10) Patent No.: US 10,490,823 B2
(45) Date of Patent: Nov. 26, 2019

(54) ELECTRODE MATERIAL, SECONDARY BATTERY INCLUDING THE SAME, AND MANUFACTURING METHODS THEREOF

(71) Applicant: Samsung Electronics Co., Ltd., Suwon-si, Gyeonggi-do (KR)

(72) Inventors: Hyeonjin Shin, Suwon-si (KR); Dongwook Lee, Suwon-si (KR); Seongjun Park, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 346 days.

(21) Appl. No.: 15/048,142

(22) Filed: Feb. 19, 2016

(65) Prior Publication Data
US 2016/0315326 A1 Oct. 27, 2016

(30) Foreign Application Priority Data
Apr. 21, 2015 (KR) .................. 10-2015-0056002

(51) Int. Cl.
*H01M 4/133* (2010.01)
*H01M 4/66* (2006.01)
(Continued)

(52) U.S. Cl.
CPC ......... *H01M 4/663* (2013.01); *H01M 4/0428* (2013.01); *H01M 4/0471* (2013.01);
(Continued)

(58) Field of Classification Search
CPC ...... H01M 4/663; H01M 4/133; H01M 4/386; H01M 4/387; H01M 4/587; H01M 4/0428; H01M 4/0471
See application file for complete search history.

(56) References Cited

U.S. PATENT DOCUMENTS

2010/0176337 A1* 7/2010 Zhamu ............... H01M 4/1391
  252/182.1
2012/0288750 A1* 11/2012 Kung ...................... H01B 1/04
  429/188

(Continued)

FOREIGN PATENT DOCUMENTS

KR  10-2013-0106687 A   9/2013
WO  WO-2013066269 A1    5/2013
WO  WO-2013180661 A1   12/2013

OTHER PUBLICATIONS

European Search Report dated Sep. 16, 2016 for corresponding European Patent Application No. 15200069.1.

(Continued)

*Primary Examiner* — James Lee
(74) *Attorney, Agent, or Firm* — Harness, Dickey & Pierce, P.L.C.

(57) ABSTRACT

Example embodiments relate to electrode materials, secondary batteries including the electrode materials, and methods of manufacturing the electrode materials and the secondary batteries. An electrode material may include a foam structure having a plurality of pores and a plurality of nanostructures disposed in the plurality of pores. The foam structure may include a graphene foam structure. The plurality of nanostructures may include at least one of a nanoparticle and a nanorod. The plurality of nanostructures may include a material capable of accommodating/discharging ions. The electrode material may be used as an anode material of a secondary battery.

32 Claims, 13 Drawing Sheets

(51) Int. Cl.

| | | |
|---|---|---|
| *H01M 4/04* | (2006.01) | |
| *H01M 4/587* | (2010.01) | |
| *H01M 4/38* | (2006.01) | |
| *H01M 4/48* | (2010.01) | |
| *H01M 4/58* | (2010.01) | |
| *H01M 10/0525* | (2010.01) | |

(52) U.S. Cl.
CPC ........... *H01M 4/133* (2013.01); *H01M 4/386* (2013.01); *H01M 4/387* (2013.01); *H01M 4/48* (2013.01); *H01M 4/587* (2013.01); *H01M 4/5815* (2013.01); *H01M 10/0525* (2013.01); *H01M 2220/30* (2013.01)

(56) References Cited

U.S. PATENT DOCUMENTS

| | | | |
|---|---|---|---|
| 2014/0030590 A1* | 1/2014 | Wang | H01B 1/04 429/211 |
| 2014/0072871 A1 | 3/2014 | Chen et al. | |
| 2014/0342249 A1 | 11/2014 | He et al. | |
| 2016/0043384 A1* | 2/2016 | Zhamu | H01M 4/133 429/231.4 |

OTHER PUBLICATIONS

Zongping Chen et al., "Three-dimensional flexible and conductive interconnected graphene networks grown by chemical vapour deposition", Nature Materials, vol. 10, Apr. 10, 2011.

Chunhui Gao et al., "Engineered Si Sandwich electrode: Si Nanoparticles/Graphite Sheet Hybrid on Ni Foam for Next-Generation High-Performance Lithium-Ion Batteries", Applied Materials & Interfaces, American Chemical Society, 2015.

Jingbo Chang "Multilayered Si Nanoparticle/reduced Graphene Oxide Hybrid as a High-Performance Lithium-Ion Battery Anode", Advanced Materials, 2013.

Chih-Chien Kung et al., "Preparation and characterization of three dimensional graphene foam supported platinum-ruthenium bimetallic nanocatalysts for hydrogen peroxide based electrochemical biosensors", Science Direct, Biosensors and Bioelectronics 52, 2014.

Mauricio Tterrones et al., "Graphene and graphite nanoribbons: Morphology, properties, synthesis, defects and applications", Science Direct, Nano Today, 2010, pp. 351-372.

Hyojin Lee et al., "Synthesis and Optimization of Nanoparticle Ge Confined in a Carbon Matrix for Lithium Battery Anode Material", Journal of The Electrochemical Society, 154 (4), A343-A346, 2007.

P R Bandaru et al., "An outline of the synthesis and properties of silicon nanowires", Semicond. Sci. Technol. 25, 024003, 16 pages, (2010).

* cited by examiner

RELATED ART

< COMPARATIVE EXAMPLE >

ELECTRODE MATERIAL, SECONDARY BATTERY INCLUDING THE SAME, AND MANUFACTURING METHODS THEREOF

RELATED APPLICATION

This application claims the benefit of priority from Korean Patent Application No. 10-2015-0056002, filed on Apr. 21, 2015, in the Korean Intellectual Property Office, the disclosure of which is incorporated herein in its entirety by reference.

BACKGROUND

1. Field

Example embodiments relate to electrode materials, methods of forming the electrode materials, secondary batteries including the electrode materials, and/or methods of manufacturing the secondary batteries.

2. Description of the Related Art

Unlike primary batteries, secondary batteries are typically rechargeable and thus are widely used in various electronic devices, for example, cellular phones, laptop computers, camcorders, etc. Particularly, a lithium secondary battery has a higher voltage and higher energy density per unit weight when compared to a nickel-cadmium battery and a nickel-hydride battery, and thus, demand for lithium secondary batteries has increased. Lithium secondary batteries may be classified as liquid electrolyte batteries and polymer electrolyte batteries according to the type of electrolytes used therein. Batteries using a liquid electrolyte are referred to as lithium ion batteries and batteries using a polymer electrolyte are referred to as lithium polymer batteries.

As various electronic devices that include secondary batteries have been manufactured and markets therefor have expanded, demand for secondary batteries with improved characteristics, such as increased capacity, higher durability (reliability) and stability, and good flexibility has increased.

SUMMARY

Example embodiments relate to electrode materials (anode materials) capable of improving the performances of secondary batteries.

Example embodiments relate to electrode materials (anode materials) capable of increasing the charging capacity of secondary batteries.

Example embodiments relate to electrode materials (anode materials) capable of improving the stability and durability of secondary batteries.

Example embodiments relate to electrode materials (anode materials) which are flexible.

Example embodiments relate to secondary batteries including the electrode material (anode material).

Example embodiments relate to methods of forming the electrode material (anode material) and methods of manufacturing secondary batteries adopting the method of forming the electrode material.

Additional example embodiments will be set forth in part in the description which follows and, in part, will be apparent from the description, or may be learned by practice of the example embodiments.

According to an example embodiment, an anode material for a secondary battery, the anode material including a graphene foam structure including graphene frames connected to each other and a plurality of pores between and around the graphene frames, and a plurality of nanostructures disposed in the plurality of pores of the graphene foam structure.

Each, or one or more of, the plurality of nanostructures may have a nanoparticle structure or a nanorod structure.

The plurality of nanostructures may include a material capable of accommodating or discharging ions when the secondary battery is respectively charged or discharged.

Each, or one or more, of the plurality of nanostructures may include at least one of, or one selected from, silicon (Si), germanium (Ge), tin (Sn), indium (In), SnS2, SnO2, and Fe2O3.

Each of the plurality of nanostructures may include Si.

Each of the plurality of nanostructures may have a diameter of about 5 nm to about 200 nm.

At least some of the plurality of nanostructures may have a nanorod structure, and the nanorod structure may include an alloy portion in at least one end portion thereof.

A content amount of the plurality of nanostructures in the anode material may be about 1 wt % to about 50 wt %.

A porosity of the graphene foam structure may be about 5% to about 90%.

Each of the plurality of pores may have a size of about 10 nm to about 1000 μm.

The graphene foam structure may have a planar shape.

The graphene foam structure may have a particle shape.

A plurality of the graphene foam structures having the particle shape may constitute a film.

The anode material may further include a metal template foam structure included in the graphene foam structure.

The graphene foam structure may have a hollow structure in which the graphene frames have empty spaces therein.

According to an example embodiment, a secondary battery includes an anode including the anode material described above, a cathode spaced apart from the anode, and an electrolyte between the anode and the cathode.

The anode may include an anode current collector and an anode active material bonded to the anode current collector and including the anode material.

The cathode may include a cathode current collector and a cathode active material bonded to the cathode current collector.

The secondary battery may be a lithium battery.

The secondary battery may be flexible.

According to an example embodiment, a method of forming an anode material for a secondary battery includes forming a graphene foam structure having a plurality of pores, and forming a plurality of nanostructures in the plurality of pores of the graphene foam structure.

The forming of the graphene foam structure may include preparing a template foam structure and forming a graphene layer on a surface of the template foam structure.

The forming of the graphene layer may include forming the graphene layer by a chemical vapor deposition (CVD) method using a gas source, or forming the graphene layer by forming a carbon-containing layer on the surface of the template foam structure and annealing the carbon-containing layer.

The method may further include removing the template foam structure, after forming the graphene layer.

The method may further include forming a protective layer on the graphene layer, between the forming of the graphene layer and the removing of the template foam structure, and removing the protective layer after removing the template foam structure.

The forming of the plurality of nanostructures may include growing the plurality of nanostructures in the plurality of pores by a CVD method using a source gas of the nanostructures.

The forming of the plurality of nanostructures in the plurality of pores of the graphene foam structure may include preparing the plurality of nanostructures separately from the graphene foam structure, adhering the plurality of nanostructures in the plurality of pores of the graphene foam structure within a solution, and removing the graphene foam structure in which the plurality of nanostructures are adhered from the solution and annealing the same.

The forming of the plurality of nanostructures in the plurality of pores of the graphene foam structure may include preparing the plurality of nanostructures separately from the graphene foam structure, forming a mixture material by mixing the plurality of nanostructures and the graphene foam structure with a binder, applying the mixture material on a substrate to form a thin film, and annealing the thin film.

The forming of the plurality of nanostructures may include forming a plurality of seed elements in the plurality of pores of the graphene foam structure, and growing the plurality of nanostructures from the plurality of seed elements by a CVD method.

Each of the plurality of nanostructures may have a nanoparticle structure or a nanorod structure.

Each of the plurality of nanostructures may have at least one of, or at least one selected from silicon (Si), germanium (Ge), tin (Sn), indium (In), SnS2, SnO2, and Fe2O3.

According to an example embodiment, a method of manufacturing a secondary battery that includes an anode, a cathode, and an electrolyte, includes forming an anode material by using the method described above.

The method may include forming an anode including the anode material, forming the cathode, and providing an electrolyte between the anode and the cathode, wherein the forming of the anode may include forming the anode material by using the method described above.

The forming of the anode may include forming an anode current collector, and forming an anode active material bonded to the anode current collector, wherein the anode active material may include the anode material.

The forming of the cathode may include forming a cathode current collector, and forming a cathode active material bonded to the cathode current collector.

The secondary battery may be a lithium battery.

The secondary battery may be flexible.

BRIEF DESCRIPTION OF THE DRAWINGS

These and/or other example embodiments will become apparent and more readily appreciated from the following description of the example embodiments, taken in conjunction with the accompanying drawings in which.

DETAILED DESCRIPTION

Figure 1:
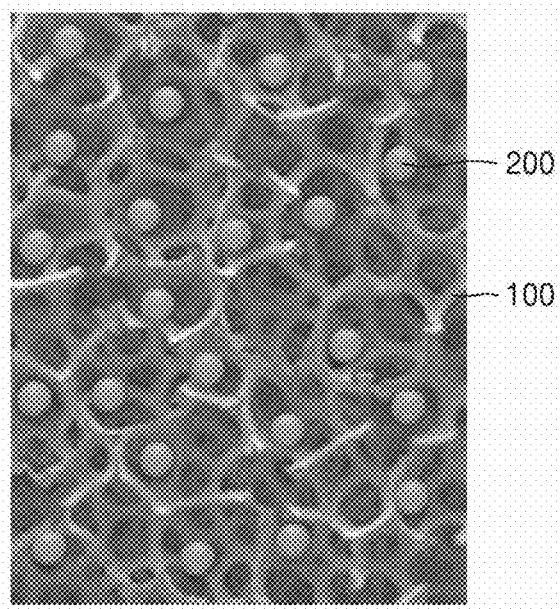
FIG. 1 is a diagram of an electrode material according to an example embodiment.

Various example embodiments will now be described more fully with reference to the accompanying drawings in which example embodiments are shown.

It will be understood that when an element is referred to as being "on," "connected" or "coupled" to another element, it can be directly on, directly connected or directly coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

Hereinafter, electrode materials, secondary batteries including the electrode materials, and methods of manufacturing the electrode materials and the secondary batteries will be described in detail below with reference to accompanying drawings. In the drawings, the sizes and thicknesses of elements may be exaggerated for clarity. Like reference numerals in the drawings denote like elements.

FIG. 1 is a Scanning Electron Microscope (SEM) image of an electrode material according to an example embodiment. The electrode material according to the example embodiment may be a composite material (or a complex material). The electrode material may be used as, for example, an anode material for a secondary battery.

Referring to FIG. 1, the electrode material according to the example embodiment may include a graphene foam structure 100. The graphene foam structure 100 may include graphene frames connected to one another and a plurality of pores between and around the graphene frames. At least some of the plurality of pores may be connected to each other. The graphene foam structure 100 may have a porous structure. Each of the plurality of pores may have a size (a diameter) of about 10 nm to about 1000 μm. For example, each of the plurality of pores may have a size (a diameter) of about tens of nm to hundreds of μm. A porosity of the graphene foam structure 100 may range from about 5% to about 90%, e.g., about 20% to about 90%. If necessary, the porosity of the graphene foam structure 100 may be greater than 90%.

According to an example embodiment, the graphene foam structure 100 may include a graphene cage structure. The graphene foam structure 100 may have a structure including a plurality of graphene cages connected to one another. Also, the graphene foam structure 100 may have a three-dimensional network structure formed by graphene (graphene frames). A graphene layer (graphene frame) forming the graphene foam structure 100 may include about 300 layers or less of graphene (or about 100 layers or less of graphene), and may have a thickness of about 100 nm or less. The graphene layer forming the graphene foam structure 100 may be a carbon structure having an ID/IG ratio (ratio of D-Raman peak over G-Raman peak in a Raman spectrum) of about 2 or less and an I2D/IG (ratio of second-order D-Raman peak over G-Raman peak in a Raman spectrum) ratio of about 0.5 or greater which are measured by using a Raman spectroscopy. For example, ID is a peak intensity within a wavenumber range of 1300 to 1400 cm−1 in a Raman spectrum, IG is a peak intensity within a wavenumber range of 1580 to 1620 cm−1, and I2D is a peak intensity around a wavenumber of 2700 cm−1. The ID/IG ratio of 2 or less and the I2D/IG ratio of 0.5 or greater may denote that the graphene layer has an excellent crystalline structure.

The electrode material according to the example embodiment may include a plurality of nanostructures 200 in the plurality of pores. That is, the plurality of nanostructures 200 may be embedded in the graphene foam structure 100. The graphene foam structure 100 may have a graphene cage structure, and the plurality of nanostructures 200 may be embedded in the graphene cage structures. The plurality of nanostructures 200 may exist in the plurality of pores outside of the graphene frames. The plurality of nanostructures 200 may contact surfaces (exterior surfaces) of the graphene frames. The plurality of nanostructures 200 may be relatively evenly distributed within the graphene foam structure 100. In addition, each of the plurality of nanostructures 200 may have a nanoparticle structure or a nanorod structure. In FIG. 1, the nanostructures 200 are formed to have nanoparticle structures. In some cases, some of the plurality of nanostructures 200 may have nanoparticle structures, and other ones of the plurality of nanostructures 200 may have nanorod structures. Shapes of the nanostructures 200 may be modified variously. The plurality of nanostructures 200 may have sizes (diameters) of, e.g., about 5 nm to about 200 nm. If necessary, at least some of the plurality of nanostructures 200 may have sizes (diameters) greater than 200 nm.

If the electrode material according to an example embodiment is used in a secondary battery, the electrode material may be used as the material of an anode in the secondary battery. The plurality of nanostructures 200 may include a material that may accommodate/discharge ions when charging/discharging the secondary battery. As a concrete example, if the electrode material is applied to a lithium battery, the nanostructures 200 may include a material that may accommodate/discharge lithium ions. Such a material may be, e.g., silicon (Si), germanium (Ge), tin (Sn), indium (In), $SnS_2$, $SnO_2$, $Fe_2O_3$, etc. In particular, Si may have an excellent property of accommodating/discharging the lithium ions. When the lithium battery is charged, the lithium ions may move from a cathode to an anode, and the nanostructures 200 may accommodate the lithium ions. The accommodation of lithium ions in the anode may be referred to as lithium (Li) intercalation or lithiation. When the lithium battery is discharged, the lithium ions may move from the anode to the cathode, and the nanostructures 200 may discharge the lithium ions. The discharge of the lithium ions from the anode may be referred to as Li deintercalation, or delithiation. Although the graphene of the graphene foam structure 100 may contribute to the Li intercalation and deintercalation, a ratio of the Li intercalation and deintercalation performed by the nanostructures 200 may be much greater than the ratio of Li intercalation and deintercalation performed by the graphene foam structure 100. Therefore, when the plurality of nanostructures 200 are provided, the capacity of the secondary battery may be greatly increased.

When the plurality of nanostructures 200 accommodate desired, or alternatively predetermined ions (e.g., Li ions), volumes of the nanostructures 200 may increase. That is, when the secondary battery including the electrode materials is charged, the volumes of the nanostructures 200 may increase. For example, each of the plurality of nanostructures 200 may be increased in volume by about 70% of the diameter thereof. In example embodiment, the nanostructures 200 may be expanded in the pores of the graphene foam structure 100, and thus, the expansion of the nanostructures 200 may be controlled within the pores. Therefore, even when the volumes of the nanostructures 200 increase, a volume of the entire electrode material or a volume of the graphene foam structure 100 may not be increased or may be hardly increased. For example, an average size (diameter) of the plurality of nanostructures 200 may be less than an average size (diameter) of the plurality of pores in the graphene foam structure 100. Also, a content amount (wt %) of the plurality of nanostructures 200 with respect to a weight of the graphene foam structure 100 in the electrode material, that is, a ratio of the plurality of nanostructures 200 with respect to a total weight, that is, a sum of the weight of the graphene foam structure 100 and weight of the plurality of nanostructures 200, may be about 1 to 50 wt %. The content amount (wt %) of the plurality of nanostructures 200 may be, for example, about 3 to 40 wt % or 5 to 30 wt %. Also, the plurality of nanostructures 200 may be formed to fill about 80% or less of a total volume of the plurality of pores. For example, the plurality of nanostructures 200 may be formed to fill about 2% to 70% of the total volume of the plurality of pores. In this case, an expansion of the volume of the graphene foam structure 100 caused by the expansion in the volume of the nanostructures 200 may be efficiently substantially prevented or reduced.

Figure 2:
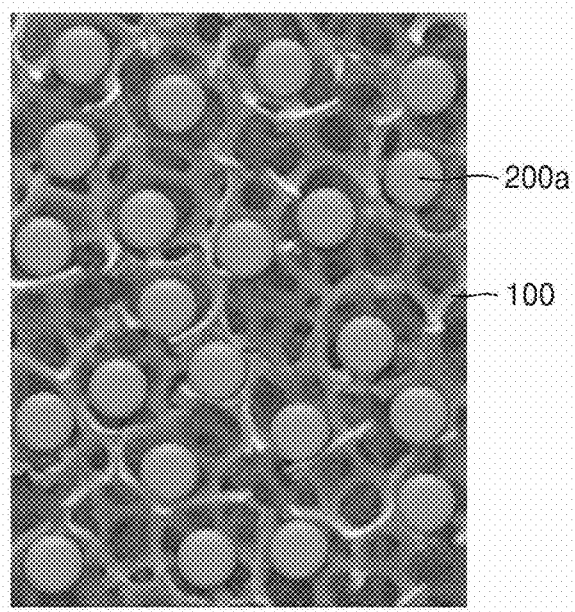
FIG. 2 is a diagram of the electrode material of FIG. 1 in which volumes of a plurality of nanostructures are expanded.

FIG. 2 is an SEM showing a case in which a plurality of nanostructures 200a have expanded in volumes, in the electrode material of FIG. 1. When the electrode material is applied as an anode material of the secondary battery, the volumes of the nanostructures 200 may expand due to the charging of the secondary battery.

Referring to FIG. 2, the plurality of nanostructures 200a expand to be greater than the nanostructures 200 of FIG. 1. Since the nanostructures 200a accommodate the ions (e.g., Li ions), that is, lithiation, volumes thereof may be increased. In the example embodiment, the volumes of the nanostructures 200a may increase within the plurality of pores of the graphene foam structure 100, and may not expand beyond the sizes of the pores. Therefore, even when the volumes of the nanostructures 200a increase, the entire volume of the graphene foam structure 100 may not increase at all or may increase to a small extent. Therefore, problems caused by the volume expansion of the nanostructures 200a may be substantially prevented or reduced.

Figure 3:
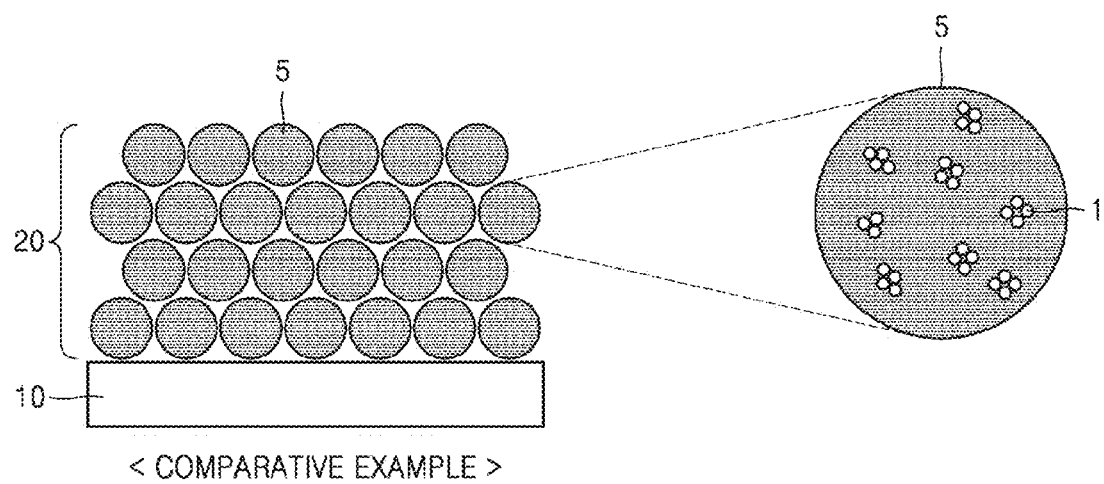
FIG. 3 is a cross-sectional view of an electrode structure (anode structure for a secondary battery) according to a comparative example.

FIG. 3 is a cross-sectional view of an electrode structure (anode structure for a secondary battery) according to a comparative example.

Referring to FIG. 3, the electrode structure according to the comparative example may include an anode plate 10 and an anode material 20 disposed on an upper surface of the anode plate 10. The anode plate 10 may be a Cu foil. The anode plate 10 may have a thickness of 15 μm or less. The anode material 20 may include a plurality of carbon particles 5 and silicon particles 1 contained respectively in the plurality of carbon particles 5. Each of the carbon particles 5 may contain a plurality of silicon particles 1. The silicon particles 1 may be referred to as a 'primary particles', and the carbon particles 5 may be referred to as a 'secondary particles'. The carbon particles 5 may be graphite. Although not shown in FIG. 3, the plurality of carbon particles 5 are bound to each other by a binder to form a substantially film or planar shape. Such above anode material 20 may be manufactured by fabricating a slurry, in which the carbon particles, the silicon particles, the binder, and a solution are mixed, and by tape casting the slurry on the anode plate 10.

If the electrode structure illustrated in FIG. 3 is applied as the anode for the secondary battery, volumes of the silicon particles 1 are expanded when the secondary battery is charged, and accordingly, a volume of the entire anode may be increased. Therefore, the secondary battery may be deformed. Due to the volume expansion, a content amount of the silicon particles 1 needs to be controlled to be about 5 wt % or less. As such, since it is difficult to increase the content amount of the silicon particles 1 due to the volume expansion, the charging capacity of the secondary battery may not be improved by using the electrode structure according to the comparative example. Also, the secondary battery may be deformed due to the volume expansion of the silicon particles 1, durability and stability of the secondary battery may not be ensured by using the electrode structure according to the comparative example. Furthermore, since there is a contact resistance between the plurality of carbon particles 5 in the electrode structure according to the comparative example, a relatively large electrical resistance may occur between an upper surface and a lower surface of the anode material 20, which may degrade the performance of the secondary battery.

However, according to the example embodiment, even if the volumes of the nanostructures 200 increase, the volume expansion of the nanostructures 200 mainly takes place in the pores of the graphene foam structure 100 as described above with reference to FIGS. 1 and 2, and thus, the volume and the shape of the graphene foam structure 100 may be maintained. Also, the graphene foam structure 100 has spaces (e.g., pores) that may accommodate a large amount of nanostructures 200. Therefore, according to the example embodiment, a substantially larger amount of the nanostructures 200 than in the comparative example of FIG. 3 may be used. Therefore, a secondary battery having a largely improved charging capacity and improved durability and stability may be manufactured by using the electrode material according to the example embodiment illustrated in FIGS. 1 and 2. Additionally, according to the example embodiment, the graphene foam structure 100 may provide a conductive path having a relatively high or excellent electric conductivity and a very small resistance. In the comparative example of FIG. 3, there is a contact resistance between the carbon particles 5. However, since the graphene foam structure 100 of FIG. 1 has a three-dimensional graphene frame structure that is continuous between an upper surface and a lower surface thereof, the electric conduction or ion movement may be provided with a very small resistance between the upper surface and the lower surface. Thus, the electrode material according to the example embodiment may be advantageous in realizing a secondary battery having excellent electric properties.

Figure 4:
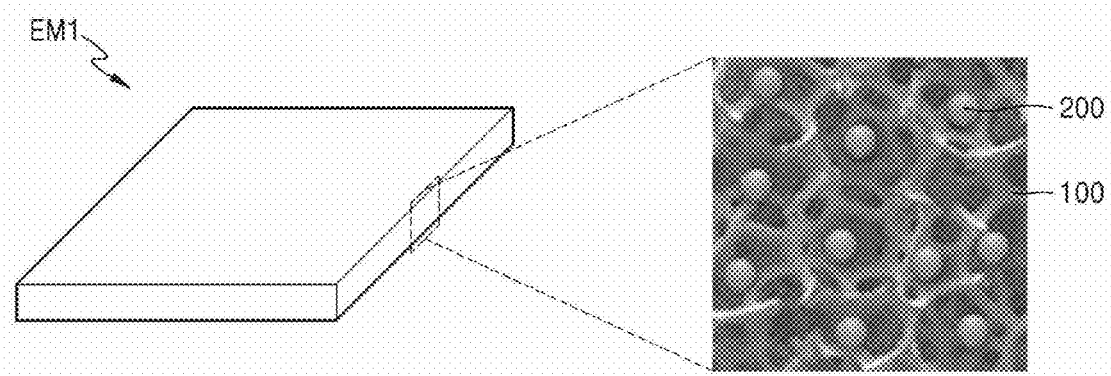
FIG. 4 is a diagram of an electrode material according to another example embodiment.
Figure 5:
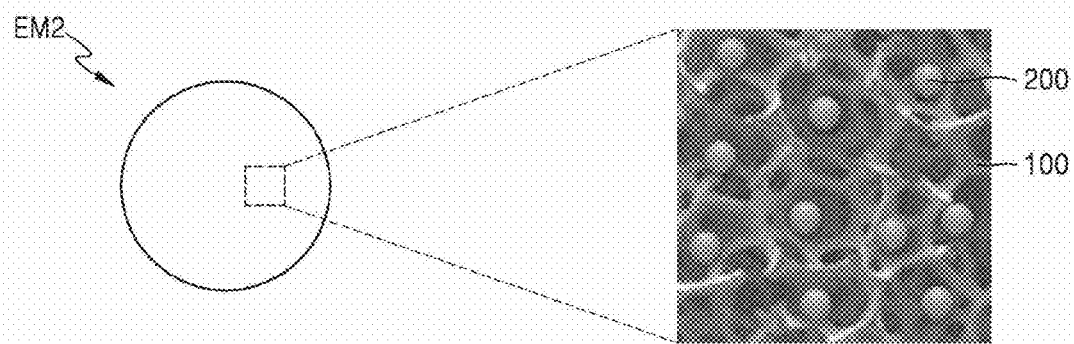
FIG. 5 is a diagram of an electrode material according to another example embodiment.

The electrode material (anode material) according to the example embodiment may have a planar shape or a particle shape. That is, the graphene foam structure 100 of FIG. 1 may be formed as a planar sheet or a particle. FIG. 4 shows that the graphene foam structure 100 of FIG. 1 is formed as a sheet, and FIG. 5 shows that the graphene foam structure 100 of FIG. 1 is formed as a particle. The electrode material (electrode structure) EM1 of FIG. 4 has a planar shape, and the electrode material (electrode structure) EM2 of FIG. 5 has a particle shape. The electrode materials EM1 and EM2 of FIGS. 4 and 5 may have microstructures described above with reference to FIG. 1. That is, the electrode materials (electrode structures) EM1 and EM2 of FIGS. 4 and 5 may respectively include the graphene foam structure 100 and the plurality of nanostructures 200 embedded in the graphene foam structure 100. The graphene foam structure 100 having the particle shape as illustrated in FIG. 5 may have a diameter of, e.g., about 1 μm to about 500 μm, or about 1 μm to about 100 μm.

Although not shown in the drawings, according to another example embodiment, a plurality of the electrode structures EM2 having the particle shape as illustrated in FIG. 5 may form a film structure. For example, the plurality of electrode structures EM2 having the particle shape as illustrated in FIG. 5 may be mixed with a binder and a solvent to fabricate a slurry or a paste, and an electrode of a thin film type may subsequently be formed of or include the slurry or the paste by using a tape casting method. In this case, an electrode structure, in which a plurality of nanostructures are embedded in a graphene foam structure, may be obtained. For example, the binder may be, e.g., polyvinylidene fluoride (PVDF), polyvinyl alcohol (PVA), polytetrafluoroethylene (PTFE), polyacrylic acid (PAA), or alginate. Such a binder may exist in the electrode of the thin film type.

According to another example embodiment, at least some of the nanostructures 200 or 200*a* in the example embodiments of FIGS. 1, 2, 4, and 5 may have nanorod shapes. An example of the nanorod is illustrated in FIG. 6.

Figure 6:
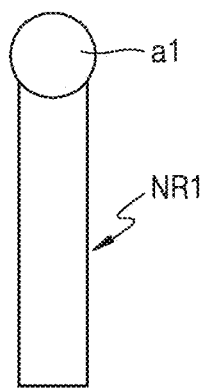
FIG. 6 is a cross-sectional view exemplarily showing a nanorod structure in an electrode material according to an example embodiment.

Referring to FIG. 6, a nanorod NR1 may have a structure extending in a first direction. An extending direction of the nanorod NR1 that is grown within the pores of the graphene foam structure 100 (see FIG. 1) may be determined randomly. The nanorod NR1 may include an alloy portion a1 disposed on at least one of opposite ends thereof. The alloy portion a1 may include a seed material for forming/growing the nanorod NR1. For example, if the nanorod NR1 is formed of or include silicon (Si), the alloy portion a1 may include an Au—Si alloy. After forming the seed material (a catalyst material) such as Au, Fe, or Ni in the pores of the graphene foam structure 100 (see FIG. 1), Si nanorods may be grown from the seed material (catalyst material) by using a vapor-liquid-solid (VLS) method. In this case, an alloy (e.g., Au—Si) of Si and the seed material may be formed on at least one end of the Si nanorod. The material forming the nanorod NR1 is not limited to Si, that is, the material forming the nanorod NR1 may be Ge, Sn, In, or the like. Accordingly, the material forming the alloy portion a1 may vary. If necessary, the alloy portion a1 may not be provided.

Additionally, like the nanorod NR1 of FIG. 6, the nanostructures 200 of nanoparticle types shown in FIG. 1 may be formed from a desired, or alternatively predetermined seed material (catalyst material). In this case, a portion of the seed material (catalyst material) may remain in the nanostructures 200. For example, the seed material (catalyst material) may form an alloy with the main material included in the nanostructures 200. Therefore, the nanostructures 200 of FIG. 1 may include a desired, or alternatively predetermined alloy region. However, when forming the nanostructures 200, using of the seed material (catalyst material) may be optional, and it may be also optional whether to include the alloy region.

According to another example embodiment, in the electrode material of FIG. 1, the graphene foam structure 100 may further include a template foam structure. The template foam structure may function as a catalyst or a seed for forming the graphene foam structure 100. For example, after preparing the template foam structure formed of or include a metal such as Ni, Cu, Fe, Co, Pt, Ru, Au, Al, Cr, Mg, Mn, Mo, Rh, Ta, Ti, W, U, V, or Zr, a graphene layer is formed on the template foam structure by using the template foam structure as a catalyst, and thereby obtaining the graphene foam structure 100. If the template foam structure is not removed after forming the graphene foam structure 100, the electrode material of FIG. 1 may include the template foam structure in the graphene foam structure 100. An example of the graphene foam structure 100 is illustrated in FIG. 7.

Figure 7:
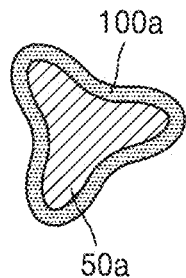
FIG. 7 is a cross-sectional view of a frame of a foam structure used in an electrode material according to an example embodiment.

FIG. 7 is a cross-sectional view of a frame of a foam structure that may be used in an electrode material according to an example embodiment.

Referring to FIG. 7, the graphene frame 100*a* of the graphene foam structure may include a metal frame 50*a* of the template foam structure. The metal frame 50*a* of the template foam structure may be formed of or include, for example, Ni, Cu, Fe, Co, Pt, Ru, Au, Al, Cr, Mg, Mn, Mo, Rh, Ta, Ti, W, U, V, or Zr. In the structure of FIG. 7, if the template foam structure, that is, the metal frame 50*a*, is removed, the graphene frame 100a may have an empty inner space H1 as illustrated in FIG. 8.

Figure 8:
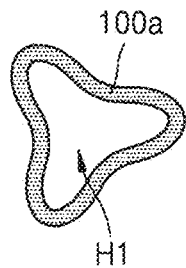
FIG. 8 is a cross-sectional view of a frame of a foam structure used in an electrode material according to another example embodiment.

Referring to FIG. 8, the graphene frame 100a may have an empty inner space. That is, the graphene frame 100a may include a hole H1 therein. The hole H1 may extend along with a direction in which the graphene frame 100a extends. If the graphene frame of the graphene foam structure 100 shown in FIG. 1 may have a cross-sectional structure as illustrated in FIG. 8, the graphene foam structure 100 may have a hollow structure. Cross-sectional structures of FIGS. 7 and 8 are examples, and may be modified variously.

Figure 9:
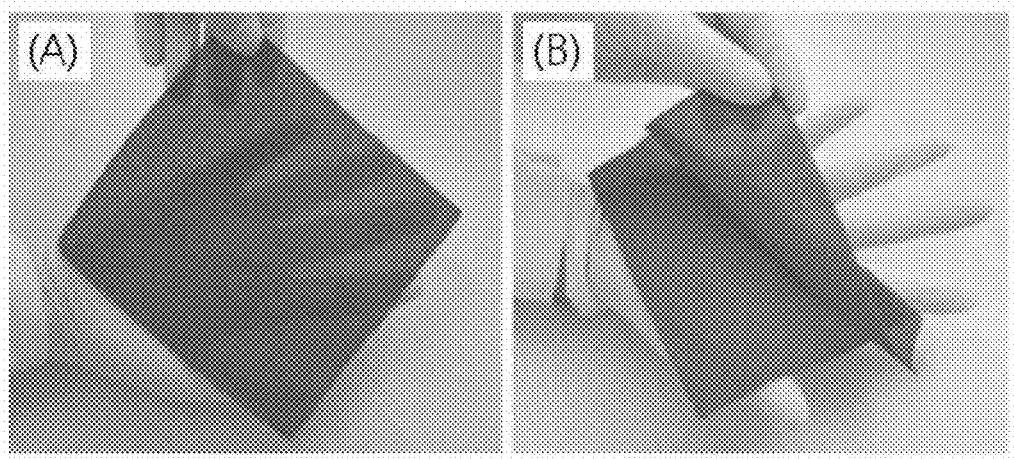
FIG. 9 is a photograph of a flexible graphene foam structure which may be applied to an electrode material according to an example embodiment.

FIG. 9 is a photograph of a graphene foam structure which may be applied to the electrode material according to an example embodiment for illustrating a flexibility of the graphene foam structure.

Referring to FIG. 9, the graphene foam structure of a planar type as shown in FIG. 9A may have an excellent flexibility as shown in FIG. 9B. The electrode material that is obtained by embedding a plurality of nanostructures (nanoparticles and/or nanorods) in the graphene foam structure may also have an excellent flexibility. Therefore, the electrode material according to the example embodiment may be applied to manufacture a flexible device (e.g., a flexible secondary battery).

Figure 10:
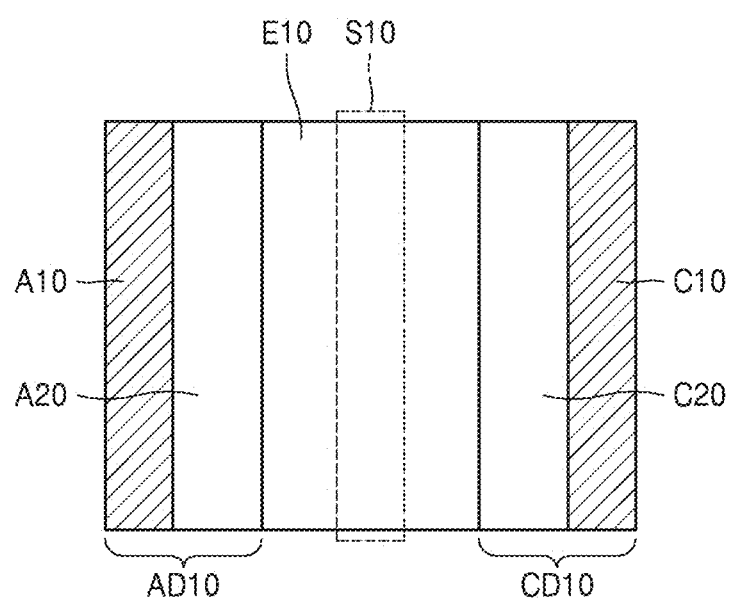
FIG. 10 is a cross-sectional view of a secondary battery including an electrode material, according to an example embodiment.

FIG. 10 is a cross-sectional view of a secondary battery including an electrode material, according to an example embodiment.

Referring to FIG. 10, the secondary battery according to the example embodiment may include an anode AD10 and a cathode CD10 that is spaced apart from the anode AD10. The secondary battery may include an electrolyte E10 that is provided for transferring ions between the anode AD10 and the cathode CD10. A separator S10 may be further provided between the anode AD10 and the cathode CD10 in order to physically separate the anode AD10 and the cathode CD10 from each other while allowing the electrolyte E10 to move or allowing the ions to move via the electrolyte E10. In some cases, the separator S10 may not be provided.

The anode AD10 may include the electrode material according to the one or more example embodiments described above with reference to FIGS. 1, 2, and 4 to 9. In more detail, the anode AD10 may include an anode current collector A10 and an anode active material A20 bonded to the anode current collector A10. For example, the anode active material A20 may include the electrode material according to the example embodiment. The cathode CD10 includes a cathode current collector C10 and a cathode active material C20 bonded to the cathode current collector C10.

The secondary battery of FIG. 10 may be, for example, a Li battery. In this case, the anode current collector A10 may include, e.g., Cu, and the cathode current collector C10 may include, e.g., Al. The cathode active material C20 may include, e.g., Li-based oxide. However, one or more example embodiments are not limited to the above materials, that is, materials for forming the Li battery may vary. Also, the secondary battery according to the example embodiment may be other secondary battery than the Li battery. Also, the secondary battery of the example embodiment may be a rigid battery or a flexible battery.

Figure 11:
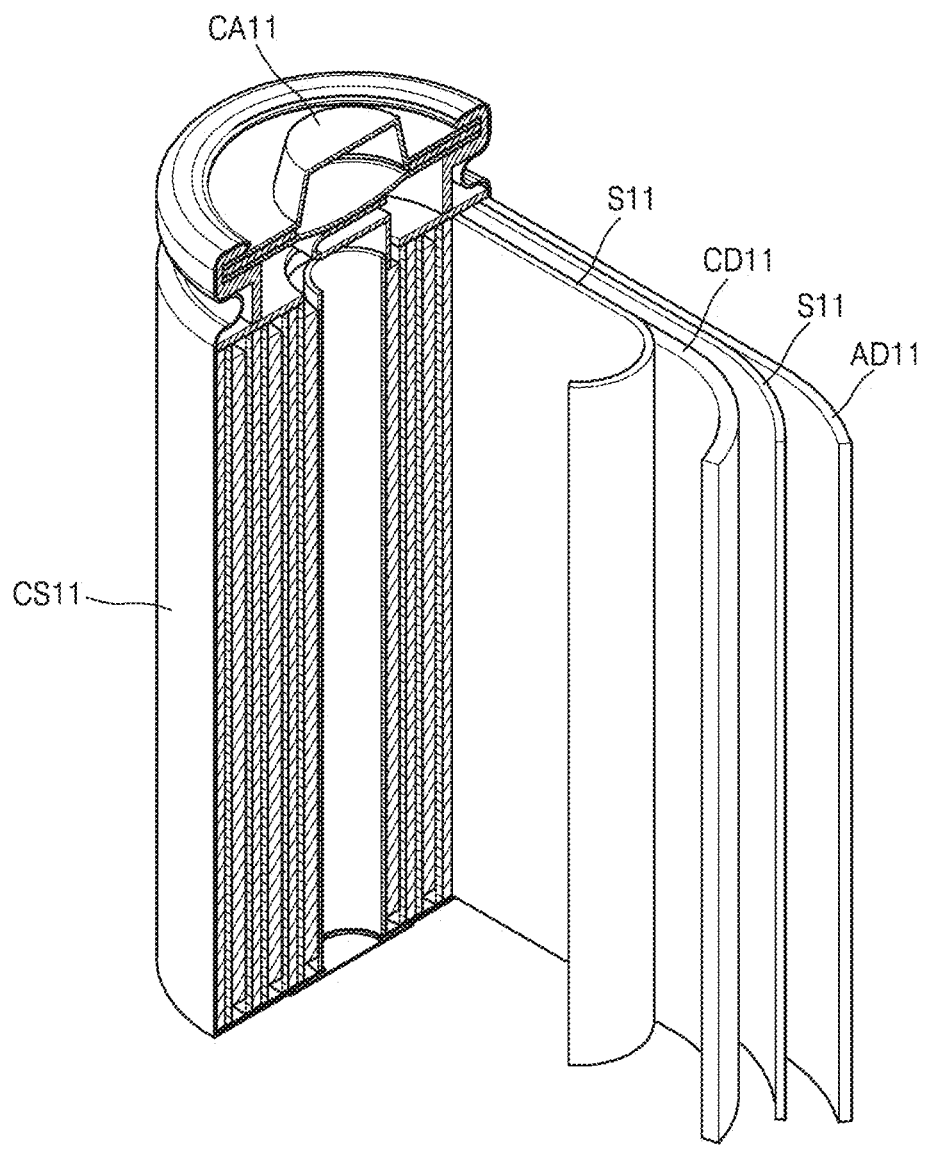
FIG. 11 is a perspective view illustrating a structure of a secondary battery according to another example embodiment.

FIG. 11 is a perspective view of a secondary battery according to another example embodiment.

Referring to FIG. 11, the secondary battery of the example embodiment includes an anode AD11, a cathode CD11, and a separator S11 disposed between the anode AD11 and the cathode CD11. The anode AD11, the cathode CD11, and the separator S11 may be wound or folded to be accommodated in a battery case CS11. An electrolyte (not shown) may be injected into the battery case CS11, and the battery case CS11 may be subsequently sealed by a cap assembly CA11. The battery case CS11 may be formed to have various shapes, e.g., a cylindrical shape, an angular shape, a pouch type, or a thin film shape. The secondary battery may be a Li battery, and the Li battery may be a Li ion battery.

Figure 12:
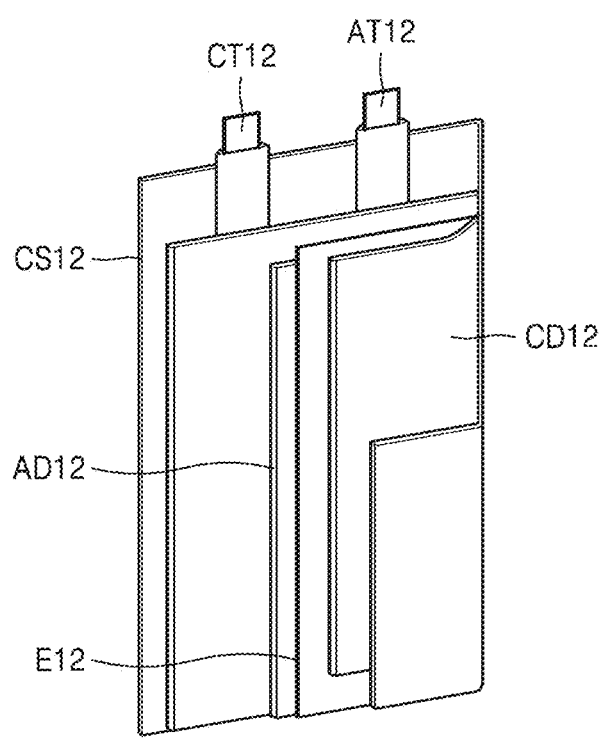
FIG. 12 is a perspective view illustrating a structure of a secondary battery according to another example embodiment.

FIG. 12 is a perspective view of a secondary battery according to another example embodiment.

Referring to FIG. 12, the secondary battery of the example embodiment may include an anode AD12, a cathode CD12, and an electrolyte E12 of a gel type disposed between the anode AD12 and the cathode CD12. The electrolyte E12 may be a polymer. Although not illustrated in FIG. 12, a separator may be further disposed between the anode AD12 and the cathode CD12. The anode AD12, the cathode CD12, and the electrolyte E12 may be accommodated in a battery case CS12. An anode terminal AT12 connected to the anode AD12 and a cathode terminal CT12 connected to the cathode CD12 may be exposed to outside of the battery case CS12. The battery case CS12 is a thin film in FIG. 12, but may be modified variously. The secondary battery may be a Li battery, and the Li battery may be a Li polymer battery.

The anodes AD11 and AD12 illustrated in FIGS. 11 and 12 may include the electrode material according to the example embodiments. That is, the electrode material described above with reference to FIGS. 1, 2, and 4 to 9 may be applied to the anodes AD11 and AD12 of FIGS. 11 and 12. However, the structure of the secondary battery is not limited to the structures of FIGS. 11 and 12, but may be modified variously. The electrode material (anode material) according to the one or more example embodiments may be applied to a flexible battery, a foldable battery, and a stretchable battery.

Hereinafter, a method of fabricating the electrode material will be described below according to one or more example embodiments.

FIGS. 13A to 13F are perspective views illustrating a method of fabricating the electrode material according to an example embodiment. FIGS. 13A to 13F include partial cross-sectional views in circles at upper right portions thereof, for convenience of description. The above partial cross-sectional views show cross-sectional structures of a frame configuring a foam structure.

Figure 13A:
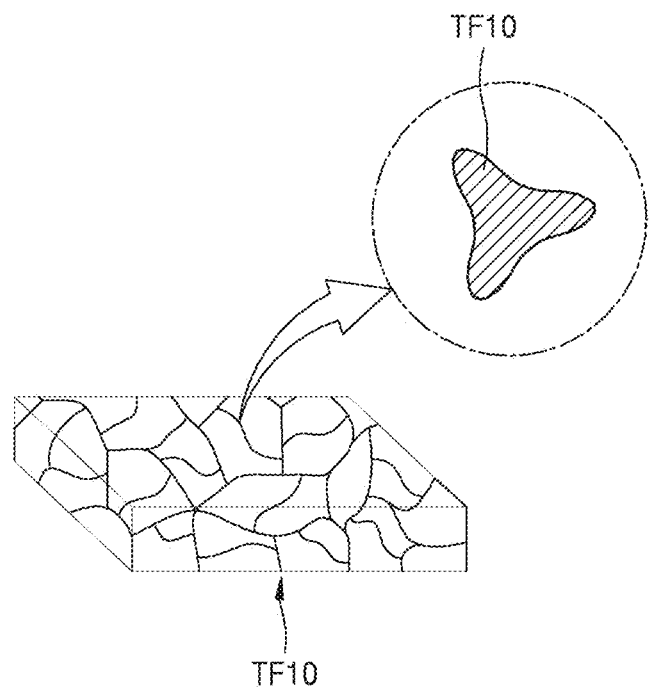
FIGS. 13A to 13F are perspective views for describing a method of forming an electrode material, according to an example embodiment.

Referring to FIG. 13A, a template foam structure TF10 may be prepared. The template foam structure TF 10 may include a catalyst material (catalyst metal) for growing graphene. For example, the template foam structure TF10 may be formed of or include metal such as Ni, Cu, Fe, Co, Pt, Ru, Au, Al, Cr, Mg, Mn, Mo, Rh, Ta, Ti, W, U, V, or Zr. As a concrete example, the template foam structure TF10 may be a Ni foam. In this case, the Ni foam may have an areal density of about 320 g/m2 or less and a thickness of about 1.2 mm or less. The template foam structure TF10 may be formed as a sheet or a film, or a particle. The shape of the template foam structure TF10 may be variously modified.

Figure 13B:
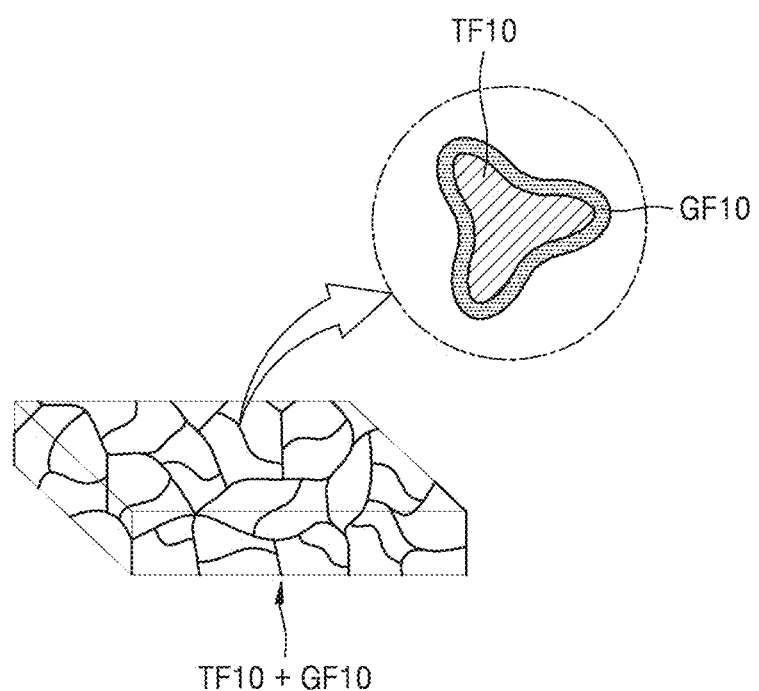

Referring to FIG. 13B, a graphene layer may be formed on a surface of the template foam structure TF10 to form a graphene foam structure GF10. For example, the graphene foam structure GF10 may be formed by using a chemical vapor deposition (CVD) method using a gas source. The gas source may be a gas containing carbon. For example, the gas source may contain $CH_4$. In addition, a $H_2$ gas and an Ar gas may be further used with the $CH_4$ gas. The CVD method may be performed at a temperature of about 700° C. or greater, e.g., a temperature of about 1000° C. A thickness of the graphene layer may be adjusted depending on a time of supplying the gas source (e.g., $CH_4$), and thus, a size of a pore in the graphene foam structure GF10 may be adjusted.

In another case, the graphene foam structure GF10 may be fabricated by forming a carbon-containing layer on the surface of the template foam structure TF10 and annealing the carbon-containing layer. The carbon-containing layer may be a precursor of the graphene layer. That is, the carbon-containing layer is a solid state carbon source for forming the graphene layer. For example, the carbon-containing layer may be formed of or include a carbon-containing polymer or amorphous carbon (a-carbon). The carbon-containing polymer may be a polymer of any structure and any composition ratio, provided that the polymer contains carbon. The carbon-containing polymer may be a self-assembly polymer or a general polymer without a self-assembly property. The carbon-containing polymer may include, for example, at least on selected from an amphiphilic polymer, a liquid crystal polymer, and a conductive polymer. The carbon-containing polymer may be applied on the surface of the template foam structure TF10 through various ways, for example, a solution process, a gas process, or the like. The a-carbon may be applied on the surface of the template foam structure TF10 by using a plasma enhanced chemical vapor deposition (PECVD) method. For example, the source material may infiltrate between frames of the template foam structure TF10 so that an amorphous carbon layer may be formed throughout the entire inner and outer portions of the template foam structure TF10. As described above, after forming the carbon-containing layer by applying the material such as the carbon-containing polymer or the a-carbon on the surface of the template foam structure TF10, the carbon-containing layer may be annealed to form the graphene foam structure GF10. The annealing may be performed at a temperature of, for example, about 400° C. to about 2000° C., and may be performed by using a rapid thermal annealing (RTA) method or a laser annealing method. The annealing may be performed in an inert atmosphere or a reducing atmosphere.

Figure 13C:
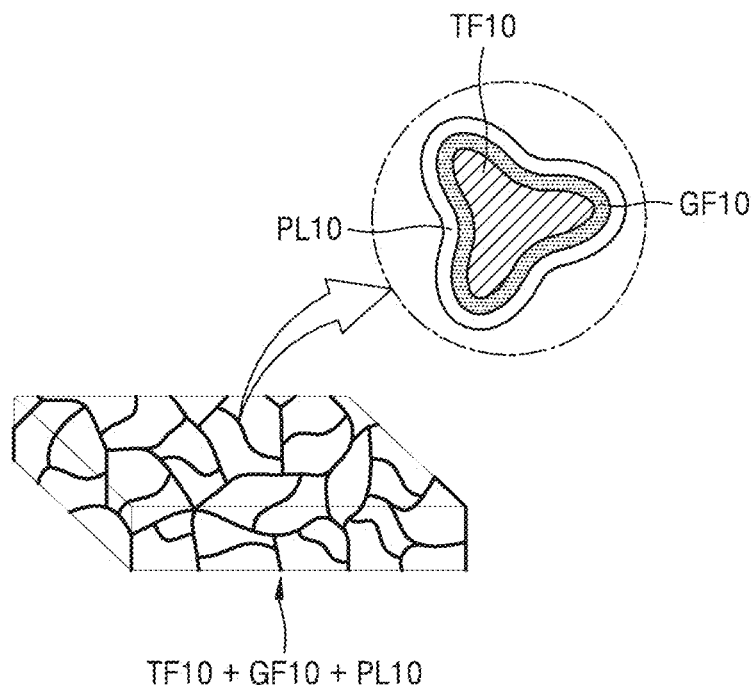

Referring to FIG. 13C, a protective layer PL10 may be formed on a surface of the graphene foam structure GF10. The protective layer PL10 may be, for example, a polymer layer. In particular, the protective layer PL10 may be a poly(methyl methacrylate) layer, that is, a PMMA layer. In this case, the graphene foam structure GF10 is dipped in a PMMA solution so that the PMMA solution may be coated on the surface of the graphene foam structure GF10 (that is, dip coating), and is subsequently dried to form the PMMA layer that may be used as the protective layer PL10. The drying process may be performed at a temperature of, for example, about 180° C., for about 30 minutes. For example, detailed forming conditions of the protective layer PL10 when the material forming the protective layer PL10 is PMMA are provided, but one or more example embodiments are not limited thereto, that is, a material and the forming conditions of the protective layers PL10 may be variously modified. The protective layer PL10 may protect and support the graphene foam structure GF10 during a post-process for removing (etching) the template foam structure TF10.

Figure 13D:
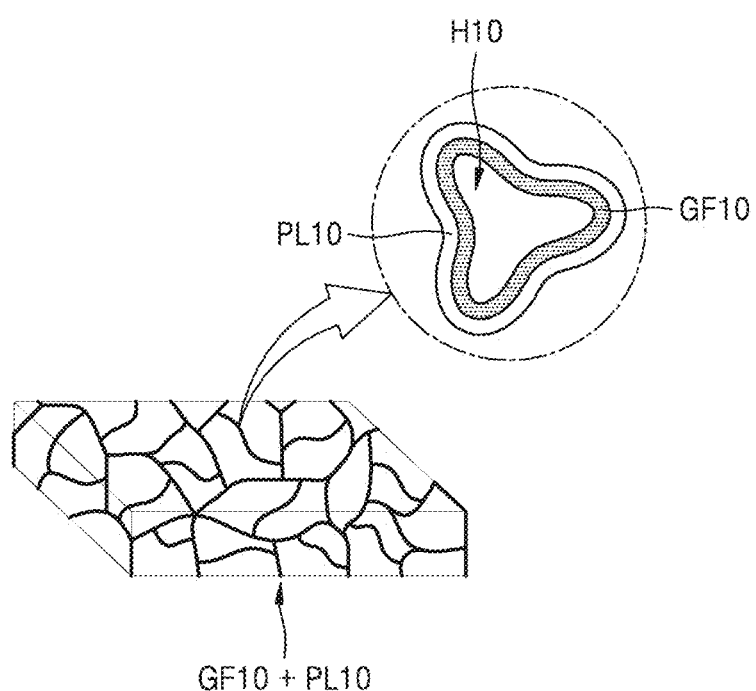

Next, the template foam structure TF10 may be removed, and a resultant after removing the template foam structure TF10 is illustrated in FIG. 13D. The template foam structure TF10 may be removed by using a desired, or alternatively predetermined etching solution. For example, the template foam structure TF10 may be removed by using an HCl solution (e.g., 3M), an $FeCl_3$ solution, or a combination thereof (e.g., $HCl/FeCl_3$, 1M/1M). The template foam structure TF10 and the graphene foam structure GF10 on which the protective layer PL10 is formed may be dipped in the etching solution to selectively remove (etch) the template foam structure TF10. The etching process may be performed at a temperature of about 80° C. for about three hours. However, a type of etching solution and a temperature and a time of performing the etching process may be modified. As the template foam structure TF10 is removed, a hole H10 may be formed in the graphene foam structure GF10. That is, the graphene foam structure GF10 may have a hollow structure.

Figure 13E:
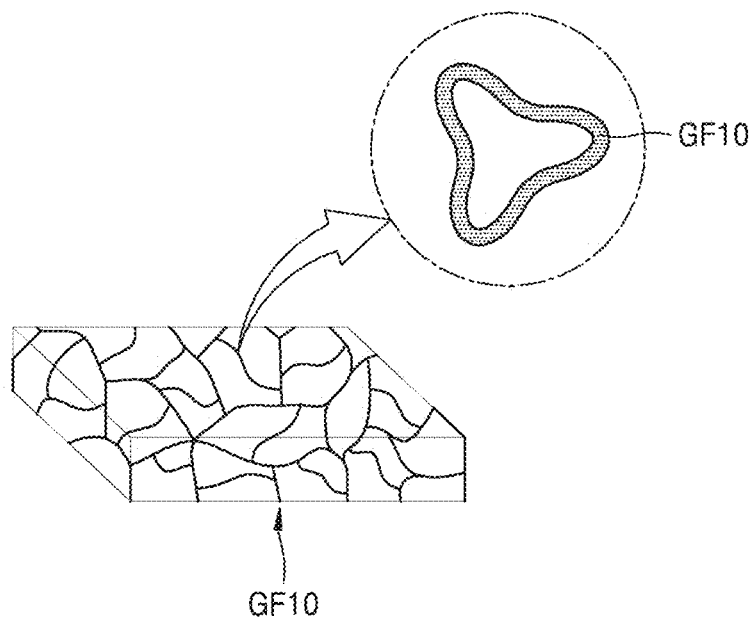

Next, the protective layer PL10 may be removed so that free-standing graphene foam structure GF10 illustrated in FIG. 13E may be obtained. The protective layer PL10 may be removed by using a desired, or alternatively predetermined etching solution. For example, the graphene foam structure GF10 on which the protective layer PL10 is formed may be dipped in the etching solution such as acetone so as to selectively remove (etch) the protective layer PL10. The etching process may be performed in a state where the etching solution is heated to a desired, or alternatively predetermined temperature of, for example, about 55° C. A type of etching solution and conditions of the etching process may be variously modified.

Since the graphene foam structure GF10 illustrated in FIG. 13E may be similar to or the same as the graphene foam structure 100 described above with reference to FIG. 1, detailed descriptions about the graphene foam structure GF10 are omitted.

In FIGS. 13A to 13E, for forming the graphene foam structure GF10, the graphene foam structure GF10 and the protective layer PL10 are sequentially formed on the surface of the template foam structure TF10, and after that, the template foam structure TF10 and the protective layer PL10 are sequentially removed (etched). However, the one or more example embodiments are not limited thereto. For example, after forming the graphene foam structure GF10 on the surface of the template foam structure TF10, the template foam structure TF10 may be removed without forming the protective layer PL10, and accordingly, the free-standing graphene foam structure GF10 may be obtained. Otherwise, after forming the graphene foam structure GF10 on the surface of the template foam structure TF10, the protective layer PL10 may not be formed and the template foam structure TF10 may not be removed. In this case, the foam structure having the cross-sectional structure described with reference to FIG. 7 may be obtained. If the template foam structure TF10 is removed as described above with reference to FIG. 13D, the foam structure having the cross-sectional structure as illustrated in FIG. 8 may be obtained. A post-process (FIG. 13F), that is, a process of introducing the plurality of nanostructures, may be performed with respect to the graphene foam structure GF10 having the cross-sectional structure as illustrated in FIG. 7 or FIG. 8.

Figure 13F:
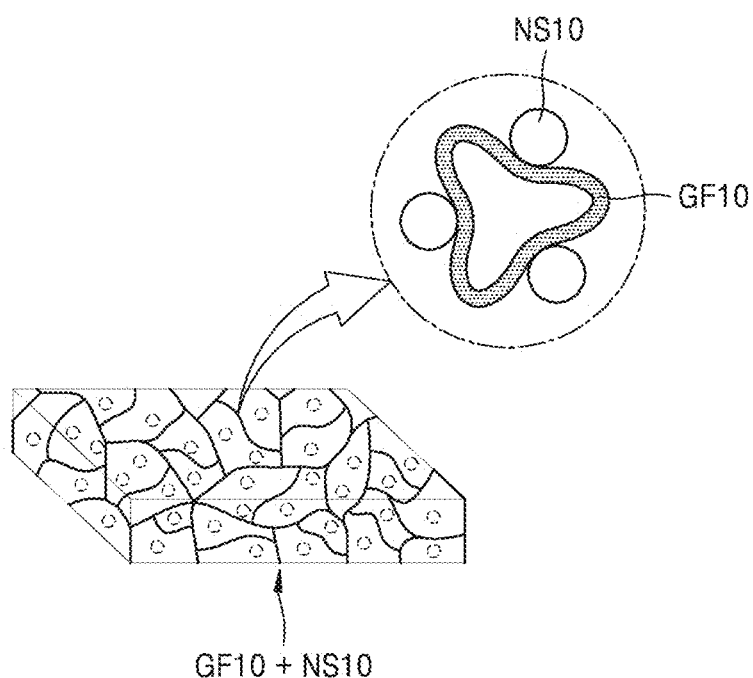

Referring to FIG. 13F, a plurality of nanostructures NS10 may be formed in a plurality of pores of the graphene foam structure GF10. A material forming the nanostructure NS10 and characteristics of the nanostructure NS10 may be similar to or the same as the material of the nanostructure 200 of FIG. 1. That is, the plurality of nanostructures NS10 may have nanoparticle or nanorod structures. For example, the nanostructure NS10 has the nanoparticle shape. The plurality of nanostructures NS10 may each have a size (diameter)

of, for example, about 5 nm to about 20 nm. The plurality of nanostructures NS10 may include, for example, Si, Ge, Sn, In, $SnS_2$, $SnO_2$, or $Fe_2O_3$.

There are various methods of embedding the plurality of nanostructures NS10 in the plurality of pores in the graphene foam structure GF10. For example, the plurality of nanostructures NS10 may be grown in the plurality of pores by using the CVD method using the source gas of the nanostructures NS10. In detail, Si nanostructures may be formed by the CVD method using $SiH_4$ or $SiCl_4$ as a source gas, and Ge nanostructures may be formed by the CVD method using $GeH_4$ as a source gas. When the plurality of nanostructures NS10 are formed by the CVD method, a desired, or alternatively predetermined seed material may be formed first, and the nanostructures NS10 may be subsequently grown from the seed material. However, using of the seed material is optional.

A method of forming a plurality of Si nanoparticles in the plurality of pores of the graphene foam structure GF10 by the CVD method will be described as follows. First, the graphene foam structure GF10 may be dipped in an $AuCl_3$ solution (1 mM $AuCl_3$ in nitromethane) for a desired, or alternatively predetermined time, and then may be dried. As such, a plurality of Au seed elements may be formed in the plurality of pores of the graphene foam structure GF10. Next, the graphene foam structure GF10 may be put into a reaction chamber, and a temperature may be raised to about 800° C. under a $N_2$ atmosphere. Subsequently, $SiCl_4$ gas and $H_2$ gas may be injected into the chamber to grow the Si nanoparticles from the seed elements. Therefore, a plurality of Si nanoparticles may be formed in the plurality of pores of the graphene foam structure GF10. For example, sizes of the Si nanoparticles may vary depending on a reaction time, for example, the Si nanoparticles having diameters of about 10 nm to 1 μm may be formed. In each of the Si nanoparticles, the alloy region such as Au—Si may remain. In the above example method, a silane gas such as $SiH_4$ gas may be used instead of the $SiCl_4$ and $H_2$ gas or instead of the $SiCl_4$ gas. If, in the above method, $GeH_4$ gas is used as the source gas instead of the $SiH_4$ gas and a growth temperature of about 400° C. is used, Ge nanoparticles may be formed. When forming the Ge nanoparticles, other conditions than the type of source gas and growth temperature may be similar to or the same as the conditions for forming the Si nanoparticles. For example, forming of the nanoparticles by using the Au seed elements is described as an example, but different materials may be used to form the seed elements. In addition, if necessary, the nanoparticles may be formed without using the seed elements.

As illustrated in FIG. 13F, after forming the plurality of nanostructures NS10 in the plurality of pores of the graphene foam structure GF10, a post annealing process may be further performed. Crystalline property of the graphene foam structure GF10 and/or the nanostructures NS10 may be improved by the post annealing process, and a contact property between the graphene foam structure GF10 and the nanostructure NS10 may be improved. The post annealing process may be performed at a temperature that is lower than a melting point of the nanostructures NS10. For example, the post annealing process may be performed at a temperature of about 1400° C. or less.

According to another example embodiment, a method of embedding the plurality of nanostructures NS10 in the plurality of pores of the graphene foam structure GF10 may be modified variously. That is, the graphene foam structure GF10 in which the plurality of nanostructures NS10 are embedded may be obtained by using another method different from the CVD method described above with reference to FIG. 13F. The example method will be described below with reference to FIGS. 14 to 16.

Figure 14:
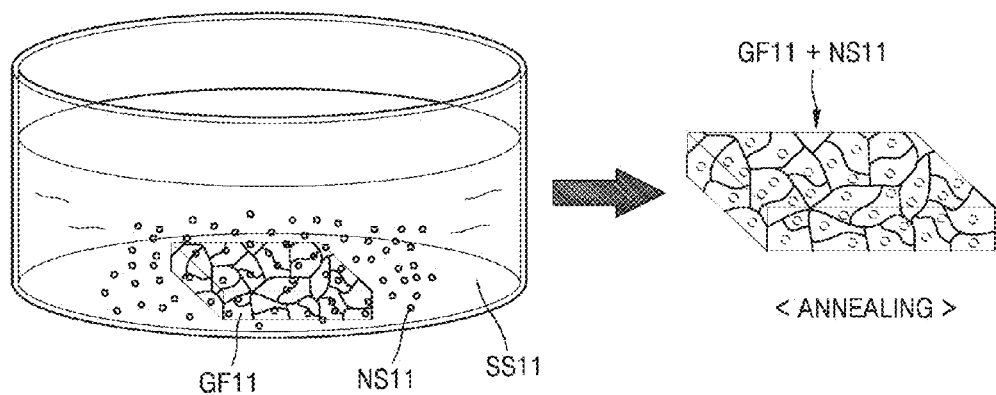
FIG. 14 is a diagram for describing a method of forming an electrode material, according to another example embodiment.

FIG. 14 is a diagram illustrating a method of embedding a plurality of nanostructures NS11 in a plurality of pores of a graphene foam structure GF11, according to another example embodiment.

Referring to FIG. 14, a plurality of nanostructures NS11 may be formed separately from the graphene foam structure GF11, and the plurality of nanostructures NS11 may be subsequently absorbed (soaked or adhered) into the plurality of pores of the graphene foam structure GF11 in a desired, or alternatively predetermined solution SS1. Since the graphene foam structure GF11 is relatively small in thickness, and the pores are relatively large in sizes, the plurality of nanostructures NS11 may be well absorbed (soaked) into the pores of the graphene foam structure GF11. Next, the graphene foam structure GF11 in which the plurality of nanostructures NS11 are absorbed (soaked) may be removed from the solution SS11 to be dried and annealed. The drying and annealing may be performed at a temperature of, for example, about 100° C. to 1400° C. Through the drying process, a remaining solution (solvent) in the graphene foam structure GF11 may be removed, and through the annealing process, the crystalline properties of the graphene foam structure GF11 and/or the nanostructures NS11 may be improved, and the contact characteristics between the graphene foam structure GF11 and the nanostructures NS11 may be improved. The annealing process may be performed at a temperature that is lower than a melting point of the nanostructures NS11. If the nanostructures NS11 are Si nanoparticles, the annealing process may be performed at a temperature of about 1400° C. or less. If the nanostructures NS11 are Ge nanoparticles, the annealing process may be performed at a temperature of about 938° C. or less. If the nanostructures NS11 are Sn nanoparticles, the annealing process may be performed at a temperature of about 232° C. or less. The temperature at which the annealing process is performed may vary depending on materials and sizes of the nanostructures NS11.

Figure 15:
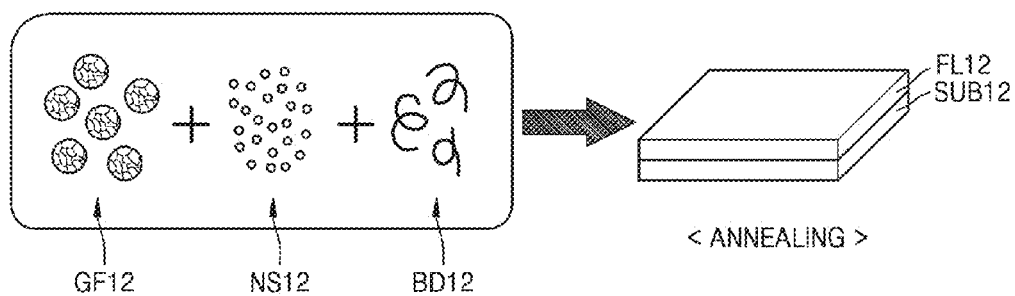
FIG. 15 is a diagram for describing a method of forming an electrode material, according to another example embodiment.

FIG. 15 is a diagram for describing a method of embedding a plurality of nanostructures NS12 in a plurality of pores of a graphene foam structure GF12, according to another example embodiment.

Referring to FIG. 15, the plurality of nanostructures NS12 may be prepared separately from the graphene foam structure GF12. For example, the graphene foam structure GF12 may include a plurality of particle structures. Therefore, the graphene foam structure GF12 may be referred to as a plurality of graphene foam particle structures. The plurality of graphene foam particle structures may have diameters of, for example, 1 μm to 500 μm or 1 μm to 100 μm. The plurality of nanostructures NS12 and the graphene foam structure GF12 may be mixed with a desired, or alternatively predetermined binder BD12 to form a mixture material. The binder BD12 may be, e.g., PVDF, PVA, PTFE, PAA, or alginate. The plurality of nanostructures NS12, the graphene foam structure GF12, and the binder BD12 may be mixed within a desired, or alternatively predetermined solvent to form the mixture material, and at least one additive such as a dispersing agent may be further added. The mixture material may be referred to as a slurry or a paste. Next, the mixture material may be applied on a substrate (e.g., an anode current collector) SUB12 to form a thin film FL12, and the thin film FL12 may be annealed so as to form the electrode material according to the example embodiment. Through the annealing process of the thin film FL12, crystalline properties of the graphene foam structure GF12 and/or the nanostructures NS12 may be improved, and a contact property between the graphene foam structure GF12 and the nanostructures NS12 may be improved. The annealing process may be performed at a temperature that is lower than a melting point of the nanostructures NS12. Detailed conditions of the annealing process may be similar to or the same as those of FIG. 14. The temperature at which the annealing process is performed may vary depending on the materials and sizes of the nanostructures NS12.

Figure 16:
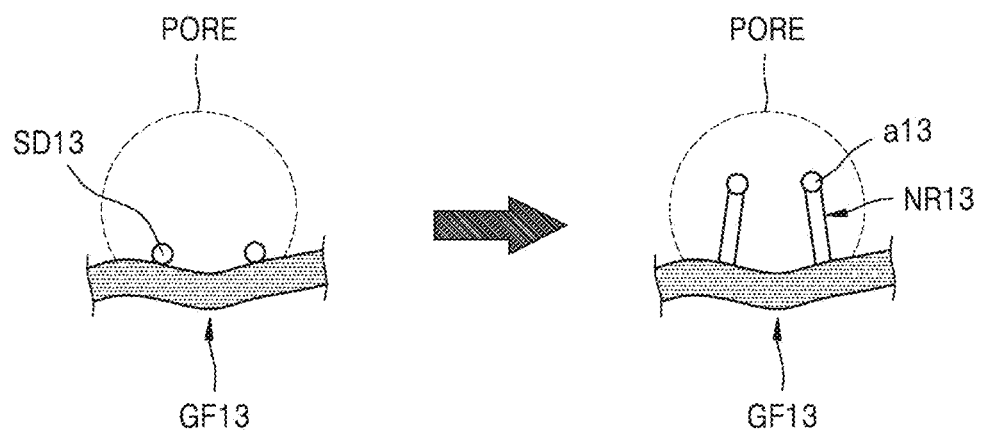
FIG. 16 is a diagram for describing a method of forming an electrode material, according to another example embodiment.

FIG. 16 is a diagram for describing a method of embedding a plurality of nanostructures NR13 into a plurality of pores of a graphene foam structure GF13, according to another example embodiment. FIG. 16 schematically shows a partial area of the graphene foam structure GF13 and processes with respect to one pore, for convenience of description. However, the processes illustrated in FIG. 16 may be performed in the plurality of pores throughout part of or the entire region of the graphene foam structure GF13.

Referring to FIG. 16, at least one seed element SD13 may be formed in a pore of the graphene foam structure GF13. The seed element SD13 may be a dot type or a particle type. The seed element SD13 may include a catalyst for forming the nanostructure NR13. For example, if the nanostructure to be formed is a Si-based nanostructure, the seed element SD13 may include a metal catalyst such as Au, Fe, or Ni. In more detail, the graphene foam structure GF13 may be dipped in an $AuCl_3$ solution, the Au material may be adhered (absorbed) on surfaces of the graphene in the plurality of pores of the graphene foam structure GF13. As such, the seed element SD13 may be formed of or include Au. In this case, the seed element SD13 may be in a liquid phase. However, materials forming the seed element SD13 and the method of forming the seed element SD13 may be modified variously.

Next, the plurality of nanostructures NR13 may be grown from a plurality of seed elements SD13. The CVD method may be a vapor-liquid-solid (VLS) method based on the CVD. In the CVD method, a silane-based gas may be used as a source gas. For example, the silane-based gas such as $SiH_4$ or $Si_2H_6$ may be used. The nanostructures NR13 formed by using the above method may have nanorod structures. Also, an alloy portion a13 may be formed on at least one of opposite ends of each nanostructure NR13. The alloy portion a13 may be formed at one end or both ends of the nanostructure NR13. If the seed element SD13 includes Au and the nanostructure NR13 includes Si, the alloy portion a13 may include an Au—Si alloy. The material forming the seed element SD13 is not limited to Au, but the seed element SD13 may be formed of or include Fe or Ni. In addition, the material forming the nanostructures NR13 is not limited to Si, but Ge, Sn, or In may be used to form the nanostructures NR13. Accordingly, the alloy in the alloy portion a13 may vary. In some cases, the alloy portion a13 may not be formed. Additionally, in FIG. 16, if the nanostructures NR13 are Si nanorods, the Si nanorods may have, for example, a (111) orientation, a (110) orientation, or a (100) orientation.

FIGS. 13F, and 14 to 16 illustrate various example methods of embedding the plurality of nanostructures in the plurality of pores of the graphene foam structure, but one or more example embodiments are not limited thereto.

The example method of forming the electrode material described above with reference to FIGS. 13 to 16 may be applied to manufacture a secondary battery including the electrode material. When the secondary battery is manufactured, a process of forming a first electrode may include the process of forming the electrode material according to the above example embodiment. In more detail, in a method of manufacturing the secondary battery including forming an anode, forming a cathode, and providing an electrolyte between the anode and the cathode, the forming of the anode may include the process of forming the electrode material (anode material) according to the example embodiment described above. The forming of the anode may include forming an anode current collector and forming an anode active material bonded to the anode current collector, and the forming of the cathode may include forming a cathode current collector and forming a cathode active material bonded to the cathode current collector. For example, when the anode active material is formed, the electrode material (anode material) according to the example embodiment may be applied. The secondary battery manufactured as above may have the structure that is the same as the structures illustrated in FIGS. 10 to 12, or may have various structures modified from the structures illustrated in FIGS. 10 to 12. The secondary battery may be a Li battery. The Li battery may be a Li ion battery or a Li polymer battery. Also, the secondary battery may be a rigid battery or a flexible battery. The secondary battery may be a foldable battery or a stretchable battery.

As described above, according to one or more example embodiments, the electrode material, in which the plurality of nanostructures are embedded in the plurality of pores of the graphene foam structure, may be formed, and the secondary battery adopting the electrode material may be manufactured. A large amount of nanostructures may be embedded in the plurality of pores of the graphene foam structure, and even when the volumes of the nanostructures expand, the volume of the entire graphene foam structure may not increase or may rarely increase. Therefore, a charging capacity of the secondary battery may be greatly improved, and the stability and the durability of the secondary battery may be improved. Also, excellent electrical properties (e.g., excellent electric conductivity or ion conductivity) of the graphene foam structure may be a factor for improving electrical performance of the secondary battery. Additionally, since the electrode material may have a flexibility, a flexible device (secondary battery) may be easily manufactured by using the electrode material.

It should be understood that the example embodiments described therein should be considered in a descriptive sense only and not for purposes of limitation. For example, one of ordinary skill in the art would have appreciated that the configuration of the electrode material described with reference to FIGS. 1, 2, and 4 to 9 and configuration of the secondary battery described with reference to FIGS. 10 to 12 may be variously modified. Also, one of ordinary skill in the art would have appreciated that the example method of forming the electrode material and the example method of manufacturing the secondary battery described with reference to FIGS. 13 to 16 may be variously modified. Moreover, the electrode material according to the one or more example embodiments may be applied to a field rather than the secondary battery as an electrode or other purposes than the electrode. While one or more example embodiments have been described with reference to the figures, it will be understood by those of ordinary skill in the art that various changes in form and details may be made therein without departing from the spirit and scope as defined by the following claims.

What is claimed is:

1. An anode material for a secondary battery, the anode material comprising:

a graphene foam structure including graphene frames connected to each other and a plurality of pores between and around the graphene frames, the graphene frames constituting a three-dimensional network structure by being connected to each other in both of a vertical direction and a horizontal direction of the graphene foam structure, each of the graphene frames encompass a hollow space that extends along a direction the graphene frame extends, the hollow space being different from the pores; and a plurality of nanostructures in the plurality of pores of the graphene foam structure.

2. The anode material of claim 1, wherein at least one of the plurality of nanostructures has a nanoparticle structure or a nanorod structure.

3. The anode material of claim 1, wherein the plurality of nanostructures comprise a material configured to accommodate or discharge ions when the secondary battery is respectively charged or discharged.

4. The anode material of claim 1, wherein at least one of the plurality of nanostructures comprises at least one of from silicon (Si), germanium (Ge), tin (Sn), indium (In), $SnS_2$, $SnO_2$, and $Fe_2O_3$.

5. The anode material of claim 4, wherein at least one of the plurality of nanostructures comprises Si.

6. The anode material of claim 1, wherein at least one of the plurality of nanostructures has a diameter of about 5 nm to about 200 nm.

7. The anode material of claim 1, wherein at least one of the plurality of nanostructures have a nanorod structure, and the nanorod structure comprises an alloy portion at least at one end portion thereof.

8. The anode material of claim 1, wherein a concentration of the plurality of nanostructures in the anode material is about 1 wt % to about 50 wt %.

9. The anode material of claim 1, wherein a porosity of the graphene foam structure is about 5% to about 90%.

10. The anode material of claim 1, wherein at least one of the plurality of pores has a size of about 10 nm to about 1000 μm.

11. The anode material of claim 1, wherein a shape of the graphene foam structure includes a planar shape.

12. The anode material of claim 1, wherein a shape of the graphene foam structure includes a particle shape.

13. The anode material of claim 12, wherein a plurality of the graphene foam structures having the particle shape constitute a film.

14. The anode material of claim 1, further comprising a metal template foam structure included in the graphene foam structure.

15. The anode material of claim 1, wherein the graphene frames have a closed shape configuration.

16. The anode material of claim 1, wherein the graphene foam structure is a three-dimensional foam structure.

17. A secondary battery comprising:
an anode including the anode material of claim 1;
a cathode apart from the anode; and
an electrolyte between the anode and the cathode.

18. The secondary battery of claim 17, wherein the anode comprises an anode current collector and an anode active material bonded to the anode current collector and including the anode material, and the cathode comprises a cathode current collector and a cathode active material bonded to the cathode current collector.

19. The secondary battery of claim 17, wherein the secondary battery is a lithium battery.

20. The secondary battery of claim 17, wherein the secondary battery is flexible.

21. A method of forming an anode material for a secondary battery, the method comprising:
forming a graphene foam structure including graphene frames connected to each other and having a plurality of pores between and around the graphene frames, the graphene frames constituting a three-dimensional network structure by being connected to each other in both of a vertical direction and a horizontal direction of the graphene foam structure, each of the graphene frames encompass a hollow space that extends along a direction the graphene frame extends, the hollow space being different from the pores; and
forming a plurality of nanostructures in the plurality of pores of the graphene foam structure.

22. The method of claim 21, wherein the forming of the graphene foam structure comprises:
preparing a template foam structure; and
forming a graphene layer on a surface of the template foam structure.

23. The method of claim 22, wherein the forming of the graphene layer comprises:
forming the graphene layer via chemical vapor deposition (CVD) using a gas source, or
forming the graphene layer by forming a carbon-containing layer on the surface of the template foam structure and annealing the carbon-containing layer.

24. The method of claim 22, further comprising removing the template foam structure, after forming the graphene layer.

25. The method of claim 24, further comprising:
forming a protective layer on the graphene layer, between the forming of the graphene layer and the removing of the template foam structure; and
removing the protective layer after removing the template foam structure.

26. The method of claim 21, wherein the forming of the plurality of nanostructures comprises growing the plurality of nanostructures in the plurality of pores via CVD using a source gas of the nanostructures.

27. The method of claim 21, wherein the forming of the plurality of nanostructures in the plurality of pores of the graphene foam structure comprises:
preparing the plurality of nanostructures separately from the graphene foam structure;
adhering the plurality of nanostructures in the plurality of pores of the graphene foam structure in a solution; and
removing the graphene foam structure in which the plurality of nanostructures are adhered from the solution and annealing the same.

28. The method of claim 21, wherein the forming of the plurality of nanostructures in the plurality of pores of the graphene foam structure comprises:
preparing the plurality of nanostructures separately from the graphene foam structure;
forming a mixture material by mixing the plurality of nanostructures and the graphene foam structure with a binder;
applying the mixture material on a substrate to form a thin film; and
annealing the thin film.

29. The method of claim 21, wherein the forming of the plurality of nanostructures in the plurality of pores of the graphene foam structure comprises:

forming a plurality of seed elements in the plurality of pores of the graphene foam structure; and
growing the plurality of nanostructures from the plurality of seed elements via CVD.

30. The method of claim 21, wherein one or more of the plurality of nanostructures has a nanoparticle structure or a nanorod structure.

31. The method of claim 21, wherein one or more of the plurality of nanostructures comprises at least one of silicon (Si), germanium (Ge), tin (Sn), indium (In), $SnS_2$, $SnO_2$, and $Fe_2O_3$.

32. A method of manufacturing a secondary battery including an anode, a cathode, and an electrolyte, the method comprising:
forming an anode material via the method of claim 21.

* * * * *